United States Patent
Malrait et al.

(10) Patent No.: US 9,755,547 B2
(45) Date of Patent: Sep. 5, 2017

(54) SYSTEM FOR CONTROLLING AN ELECTRICAL LOAD

(71) Applicant: Schneider Toshiba Inverter Europe SAS, Pacy-sur-Eure (FR)

(72) Inventors: Francois Malrait, Jouy sur Eure (FR); Michael Hernandez, Paris (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 14/913,880

(22) PCT Filed: Sep. 11, 2014

(86) PCT No.: PCT/EP2014/069389
§ 371 (c)(1),
(2) Date: Feb. 23, 2016

(87) PCT Pub. No.: WO2015/036479
PCT Pub. Date: Mar. 19, 2015

(65) Prior Publication Data
US 2016/0211766 A1    Jul. 21, 2016

(30) Foreign Application Priority Data
Sep. 11, 2013  (FR) ...................... 13 58733

(51) Int. Cl.
*H02M 5/45*  (2006.01)
*H02M 7/537*  (2006.01)
(Continued)

(52) U.S. Cl.
CPC ............. *H02M 7/537* (2013.01); *H02M 5/45* (2013.01); *H02M 7/493* (2013.01); *H02P 27/08* (2013.01); *H02M 2007/4822* (2013.01)

(58) Field of Classification Search
None
See application file for complete search history.

(56) References Cited

U.S. PATENT DOCUMENTS 5,446,645 A * 8/1995 Shirahama ............... H02J 3/46
                                                   307/58
6,917,271 B2   7/2005 Zhang et al.
(Continued)

FOREIGN PATENT DOCUMENTS

DE    41 05 868 A1    9/1991
JP    2008-086127 A   4/2008

OTHER PUBLICATIONS

International Search Report issued Feb. 5, 2015, in PCT/EP2014/069389 filed Sep. 11, 2014.
(Continued)

*Primary Examiner* — Jeffrey Gblende
(74) *Attorney, Agent, or Firm* — Oblon, McClelland, Maier & Neustadt, L.L.P.

(57) ABSTRACT

The present invention relates to a control system for an electric charge, said system comprising: —A first power converter (VV1) and a second power converter (VV2) connected in parallel, —A first control unit (UC1) associated with the first power converter and a second control unit (UC2) associated with the second power converter, —The second control unit (UC2) comprises a main control module (M1_2) for determining a second output voltage (vσ2) to apply the electric charge and a secondary control module (M2_2) to determine a control voltage (Δvσk) to be applied to said second output voltage (vσ2), said control voltage being determined from the difference between the output current (iσ2) of the second power converter and the output current (iσ1) of the first power converter.

6 Claims, 2 Drawing Sheets

(51) Int. Cl.
*H02P 27/08* (2006.01)
*H02M 7/493* (2007.01)
*H02M 7/48* (2007.01)

(56) References Cited

U.S. PATENT DOCUMENTS

| | | | |
|---|---|---|---|
| 7,327,111 | B2 | 2/2008 | Rastogi et al. |
| 8,188,694 | B2 | 5/2012 | Tallam et al. |
| 2008/0073978 | A1* | 3/2008 | Ollila ............ H02M 7/493 307/82 |
| 2008/0158917 | A1* | 7/2008 | Chen ............. H02J 9/062 363/34 |
| 2009/0116266 | A1* | 5/2009 | Lai ............... H02M 7/493 363/40 |
| 2012/0013283 | A1* | 1/2012 | Tallam ........... H02M 5/4585 318/400.26 |

OTHER PUBLICATIONS

International Search Report dated Feb. 5, 2015, in PCT/EP2014/069389 filed Sep. 11, 2014.

Panov, Y. et al., "Analysis and Design of N Paralleled DC-DC Converters with Master-Slave Current-Sharing Control", Twelth Annual Applied Power Electronics Conference and Exposition, Conf. 12, (Feb. 23, 1997), pp. 436-442, XP000736214.

* cited by examiner

SYSTEM FOR CONTROLLING AN ELECTRICAL LOAD

TECHNICAL FIELD OF THE INVENTION

The present invention relates to a system for controlling an electrical load.

PRIOR ART

With a view to increasing the power supplied to the same electrical load, it is known to place several power converters in parallel. The main problem with this configuration lies in the fact that a current flows from one power converter to the other. The result is that the sum of the currents on the three output phases of a power converter is not zero whereas it should be. For minimizing this problem, one known solution is to synchronize the PWM (Pulse Width Modulation) controls of the inverter stages therebetween. Such solutions are, for example, disclosed in patents U.S. Pat. Nos. 7,327,111, 8,188,694 or 6,917,271. They use a centralized control unit which generates the PWM signals intended for the inverter stages of all the power converters connected in parallel. On the other hand, with a separate control unit for controlling each inverter stage, synchronizing the PVVM signals is no longer sufficient since it does not guarantee that each control unit generates the same output voltage. From one power converter to another, fluctuations appear, linked, for example, to variations in the parameters, gains or measurements of currents.

The aim of the invention is therefore to provide a control system using multiple power converters connected in parallel by the DC bus on the one hand, by the motor voltages on the other via an inductance circuit, for controlling an electrical load, said control system being arranged for balancing the output currents between the power converters connected in parallel.

DISCLOSURE OF THE INVENTION

This aim is achieved by a system for controlling an electrical load, said system including:
- A first power converter and a second power converter connected in parallel, each power converter including an inverter stage with an output connected to the electrical load.
- A first control unit assigned to controlling the inverter stage of the first power converter and a second control unit assigned to controlling the inverter stage of the second power converter,
- The first control unit comprising a main control module arranged for determining a first output voltage to be applied to the electrical load, said first output voltage being determined according to the output current of the first power converter,
- The second control unit comprising a main control module arranged for determining a second output voltage to be applied to the electrical load, said second output voltage being determined from the output current of the second power converter, and a secondary control module arranged for determining a correction voltage to be applied to said second output voltage, said correction voltage being determined from the difference between the output current of the second power converter and the output current of the first power converter.

According to another feature, the first power converter and the second power converter each comprise a DC power supply bus applying a DC voltage to their inverter stage and the first power converter and the second power converter are interconnected by their DC power supply bus.

According to another feature, the DC power supply bus of the first power converter and the DC power supply bus of the second power converter each comprise a power supply line with a positive electrical potential and a power supply line with a negative electrical potential.

According to another feature, the output of the first power converter is connected to the output of the second power converter.

BRIEF DESCRIPTION OF THE FIGURES

Other features and advantages will appear in the following detailed description, which makes reference to the accompanying drawings in which.

DETAILED DESCRIPTION OF AT LEAST ONE EMBODIMENT

The inventive control system is intended for controlling an electrical load, such as, for example, an electric motor M. The control system has the feature of comprising multiple power converters connected in parallel to the same electric motor.

Figure 1:
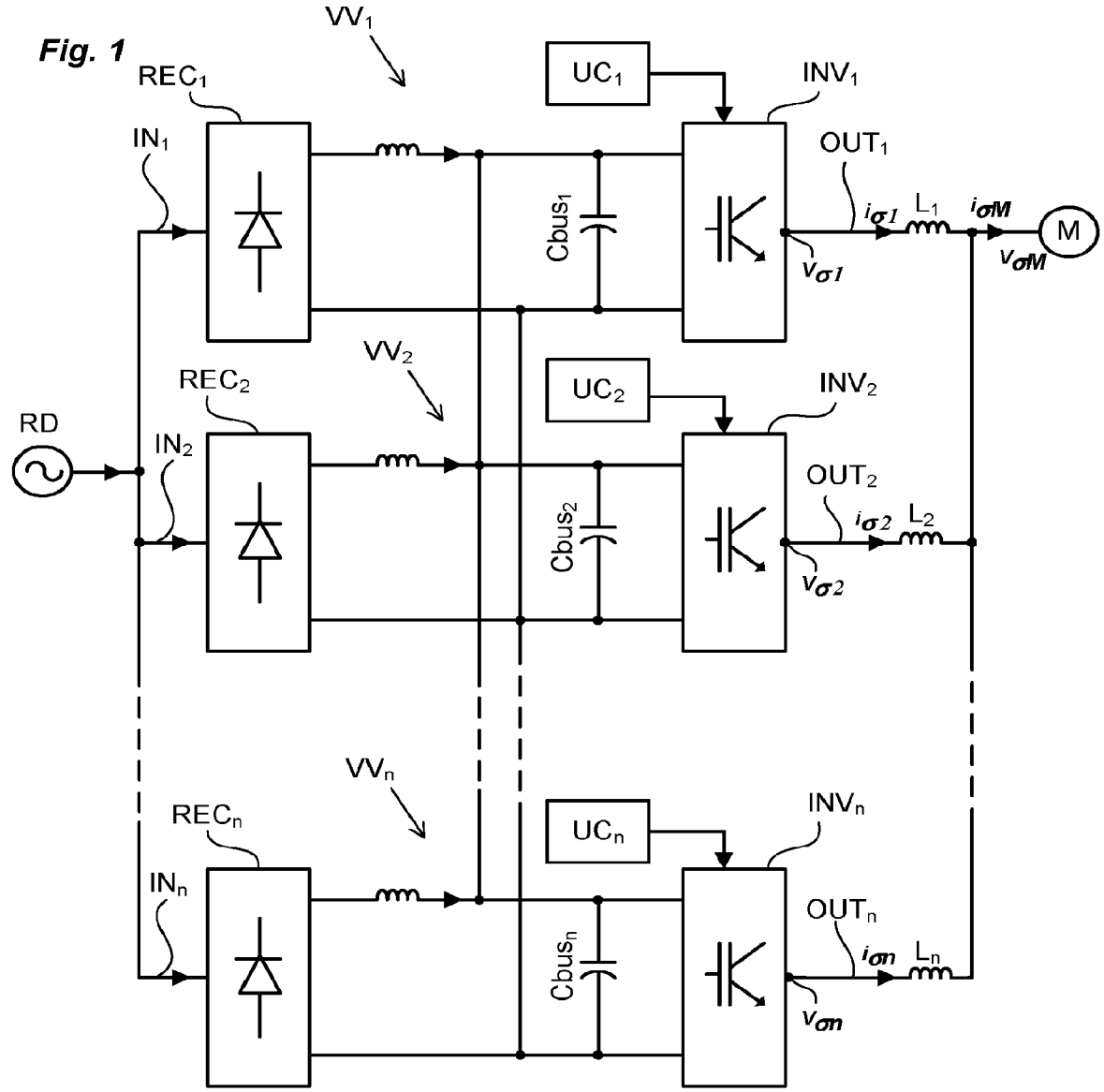
FIG. 1 represents the inventive control system.
Figure 2:
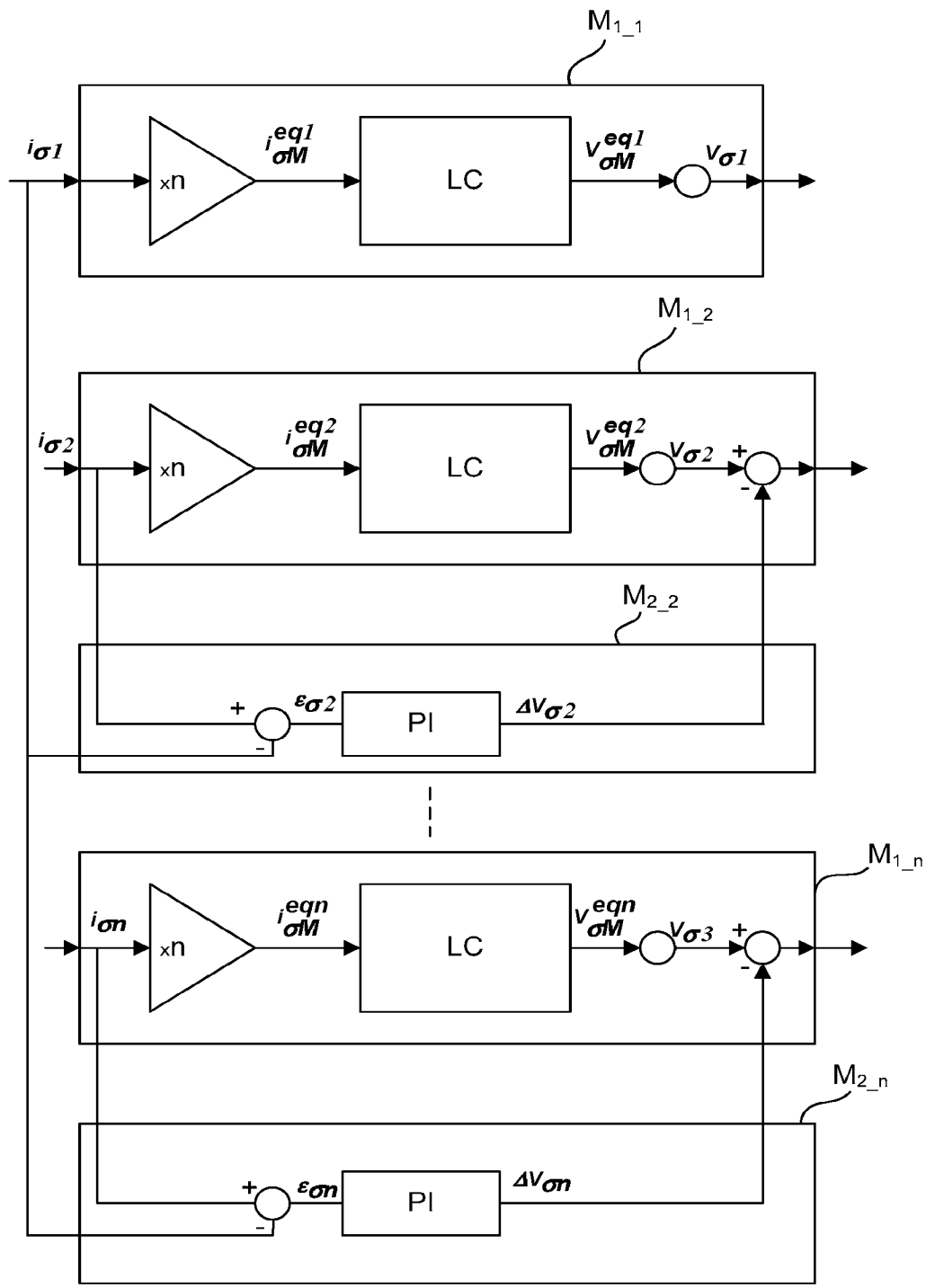
FIG. 2 schematically illustrates the control principle implemented in the inventive control system.

Each power converter is, for example, of the variable speed drive type. In a known way, as represented in FIG. 1, a variable speed drive $VV_k$ (k ranging from 1 to n) comprises:
- an input $IN_k$ comprising, for example, three input phases,
- a rectifier stage $REC_k$ connected via the input to an electrical distribution network R,
- a DC power supply bus connected to the rectifier stage and comprising a positive potential power supply line and a negative potential power supply line, the rectifier stage being arranged for rectifying the voltage supplied by the electrical distribution network with a view to applying a DC voltage on the DC power supply bus,
- one or more bus capacitors $Cbus_k$ intended to maintain the bus voltage at a constant value,
- an inverter stage $INV_k$ comprising multiple switching arms responsible for splitting the voltage supplied by the DC power supply bus into a variable voltage intended for the electric motor M,
- an output $OUT_k$ comprising, for example, three output phases, the output being connected to the switching arms of the inverter stage $INV_k$ so as to receive an output voltage $v_{ok}$. An output inductor $L_k$ is connected onto the output.

As represented in FIG. 1, multiple variable speed drives are connected in parallel by interconnecting the inputs and interconnecting the outputs. Furthermore, the variable speed drives are also interconnected by their DC power supply bus. The positive power supply lines of the variable speed drives are thus interconnected and the negative power supply lines of the variable speed drives are interconnected.

In the rest of the description, the index a is used to represent each of the three output phases.

The inventive control system also comprises multiple control units $UC_k$ (k ranging from 1 to n), a separate control unit being assigned to the control of the inverter stage $INV_k$ of each variable speed drive $VV_k$.

In a known way, a control unit $UC_k$ comprises a main control module $M_{1\_k}$ (k ranging from 1 to n) receiving as input an estimate or measurement of the output current of the controlled variable speed drive and determines, according to one or more setpoints and the parameters of the electric motor, an output voltage to be applied to the electric motor. More precisely, the output current $i_{ok}$ obtained is multiplied by the number n of variable speed drives of the system so as to determine the motor current $i_{oM}^{eqk}$. This motor current $i_{oM}^{eqk}$ is then used for determining the motor voltage $v_{oM}^{eqk}$ to be applied by implementing a known control law LC (not forming the subject matter of the invention). This motor voltage $v_{oM}^{eqk}$ then corresponds to the output voltage $v_{ok}$.

In the inventive control system, each control unit $UC_k$ autonomously determines an output voltage $v_{ok}$ to be applied to the electric motor M and each variable speed drive $VV_k$ is autonomously controlled for applying this output voltage $v_{ok}$ to the electric motor M.

In other words, for each variable speed drive of the system, the following relationships apply, forming a system S1:

$$L_1 \frac{d}{dt} i_{\sigma 1} = V_{\sigma 1} - V_{\sigma M}$$

$$L_n \frac{d}{dt} i_{\sigma n} = V_{\sigma n} - V_{\sigma M}$$

In which:
$L_1 \ldots L_n$ represents the output inductance of each variable speed drive,
$i_{o1} \ldots i_{on}$ represents the output current of each variable speed drive,
$v_{o1} \ldots v_{on}$ represents the output voltage of each variable speed drive,
$v_{oM}$ represents the overall voltage on the electric motor.
The inductors are preferably selected as being identical.

The above relationships do not guarantee that the currents are balanced when the physical components used differ from one variable speed drive to another.

Accordingly, the objective of the invention is to control the variable speed drive currents while taking account of the current to be applied to the electric motor. This objective is expressed as follows:

$$i_{o1} + i_{o2} + \ldots + i_{on} = i_{oM}$$

$$i_{o1} = i_{o2} = \ldots = i_{on}$$

For guaranteeing that the currents between the variable speed drives are balanced, the invention consists in ensuring that at least one of the output currents of a variable speed drive is known to the control units of the other variable speed drives of the system. For this, the simplest way is to select a variable speed drive called the 'master' the output current of which is sent to the control units of the other variable speed drives of the control system.

The 'master' variable speed drive is, for example, the variable speed drive of rank 1 associated with the control unit of rank 1. The 'slaves' variable speed drives are then those of ranks 2 to n, each associated with a respective control unit of rank 2 to n.

In the system thus formed, the control unit of the 'master' variable speed drive of rank 1 comprises a main control module $M_{1\_1}$ as described above, for determining the output voltage $v_{o1}$ to be applied at the output of the 'master' variable speed drive according to the output current $i_{o1}$ of the 'master' variable speed drive $VV_1$.

According to the invention, the control units of ranks 2 to n each comprise a main control module $M_{1\_k}$ (k ranging from 2 to n) as described above, which is arranged for determining the output voltage of the controlled variable speed drive and a secondary control module $M_{2\_k}$ (k ranging from 2 to n). This secondary control module is arranged for determining a correction voltage $\Delta v_{ok}$ to be applied to the output voltage $v_{ok}$ determined by the main control module $M_{1\_k}$. In each control unit of rank 2 to n, the secondary control module $M_{2\_k}$ receives, as input, the output current $i_{ok}$ of the controlled variable speed drive and the output current $i_{o1}$ of the variable speed drive $VV_1$ of rank 1. The secondary control module $M_{2\_k}$ is arranged for determining the difference between the output current $i_{ok}$ of the controlled variable speed drive $VV_k$ and the output current $i_{o1}$ of the variable speed drive of rank 1 and for injecting said difference into a proportional action corrector or a proportional-integral action corrector PI. From the difference injected as input, the corrector determines a correction voltage to be applied to the output voltage determined by the main control module. For each variable speed drive, this correction voltage thus reflects the difference to be corrected between the output current of said variable speed drive and the reference output current of the variable speed drive selected as 'master'.

The secondary control unit thereby implements a control algorithm expressed by the following relationships, for a 'slave' variable speed drive k (k ranging from 2 to n):

$$\Delta V_{\sigma k} = -KP \cdot (i_{\sigma k} - i_{\sigma 1}) + \Delta V_{Intk}$$

$$\frac{d}{dt} \Delta V_{Intk} = -KI \cdot (i_{\sigma k} - i_{\sigma 1})$$

With:
$\Delta v_{ok}$ representing the correction voltage determined for the variable speed drive k (k ranging from 2 to n),
KP, KI the gains of the controller used,
$\Delta v_{Intk}$ the integral term of the controller used.

By reusing these expressions in the system S1 expressed above, the following are obtained:

$$\begin{cases} L_2 \frac{d}{dt}(i_{\sigma 2} - i_{\sigma 1}) = -KP \cdot (i_{\sigma 2} - i_{\sigma 1}) + \Delta V_{Int2} + \begin{bmatrix} v_{\sigma M}^{2eq.} - v_{\sigma M}^{1eq.} - \\ (L_2 - L_1) \frac{d}{dt} i_{\sigma 1} \end{bmatrix} \\ \frac{d}{dt} \Delta V_{Int2} = -KI \cdot (i_{\sigma 2} - i_{\sigma 1}) \\ L_3 \frac{d}{dt}(i_{\sigma 3} - i_{\sigma 1}) = -KP \cdot (i_{\sigma 3} - i_{\sigma 1}) + \Delta V_{Int3} + \begin{bmatrix} v_{\sigma M}^{3eq.} - v_{\sigma M}^{1eq.} - \\ (L_3 - L_1) \frac{d}{dt} i_{\sigma 1} \end{bmatrix} \\ \frac{d}{dt} \Delta V_{Int3} = -KI \cdot (i_{\sigma 3} - i_{\sigma 1}) \\ L_{n-1} \frac{d}{dt}(i_{\sigma n-1} - i_{\sigma 1}) = \begin{matrix} -KP \cdot (i_{\sigma n-1} - i_{\sigma 1}) + \Delta V_{Intn-1} + \\ \begin{bmatrix} v_{\sigma M}^{n-1eq.} - v_{\sigma M}^{1eq.} - (L_{n-1} - L_1) \frac{d}{dt} i_{\sigma 1} \end{bmatrix} \end{matrix} \\ \frac{d}{dt} \Delta V_{Intn-1} = -KI \cdot (i_{\sigma n-1} - i_{\sigma 1}) \\ L_n \frac{d}{dt}(i_{\sigma n} - i_{\sigma 1}) = -KP \cdot (i_{\sigma n} - i_{\sigma 1}) + \Delta V_{Intn} + \begin{bmatrix} v_{\sigma M}^{neq.} - v_{\sigma M}^{1eq.} - \\ (L_n - L_1) \frac{d}{dt} i_{\sigma 1} \end{bmatrix} \\ \frac{d}{dt} \Delta V_{Intn} = -KI \cdot (i_{\sigma n} - i_{\sigma 1}) \end{cases}$$

Which shows an effective control of the current deviation, i.e.:

$$\begin{cases} i_{\sigma 2} = i_{\sigma 1} \\ i_{\sigma 3} = i_{\sigma 1} \\ i_{\sigma n-1} = i_{\sigma 1} \\ i_{\sigma n} = i_{\sigma 1} \end{cases}$$

In a control system with two variable speed drives, the principle of the invention is thus to ensure that the output current of one of the two variable speed drives is supplied to the other variable speed drive. If the system comprises more than two variable speed drives connected in parallel, the same principle may be used so that one of the variable speed drives supplies its output current to the other variable speed drives of the system.

The following demonstration illustrates a generalization of the solution. This general solution consists in stabilizing the following system (1):

$$L_1 \frac{d}{dt} i_{\sigma 1} = V_{\sigma 1} - V_{\sigma M} \quad (1)$$

$$L_n \frac{d}{dt} i_{\sigma n} = V_{\sigma n} - V_{\sigma M}$$

in which the currents follow the relationship:

$$i_{\sigma 1} + i_{\sigma 2} + \ldots + i_{\sigma n} = i_{\sigma M}$$

The objective is then to balance the currents between the various variable speed drives:

$$i_{\sigma 1} = i_{\sigma 2} = \ldots = i_{\sigma n}$$

To simplify writing, it is considered here that the inductances Li are all identical and equal to L. The difference between the inductances may be handled as an interference in the system thus simplified. In matrix writing, the relationships (1) become:

$$L \frac{d}{dt} \begin{pmatrix} i_{\sigma 1} \\ i_{\sigma 2} \\ \vdots \\ i_{\sigma n} \end{pmatrix} = \begin{pmatrix} V_{\sigma 1} \\ V_{\sigma 2} \\ \vdots \\ V_{\sigma n} \end{pmatrix} - \begin{pmatrix} 1 \\ 1 \\ \vdots \\ 1 \end{pmatrix} \cdot V_{\sigma M} \quad (2)$$

The voltages supplied by each variable speed drive may be resolved as the sum of two quantities:

$$v_{\sigma i} = v_{oMi} + v_{E\sigma i}$$

A first quantity $v_{oMi}$ is used to control the motor.

A second quantity $v_{E\sigma i}$ is used to control the balance of the variable speed drive currents.

To simplify writing, it is considered here that the components of the voltages $v_{oMi}$ used to control the motor are all identical and equal to $v_{om}^{REF}$. The difference between these voltage components may be handled as an interference in the system thus simplified.

P the invertible change-of-coordinates matrix is defined such that:

$$P \times \begin{pmatrix} 1 \\ 1 \\ \vdots \\ 1 \end{pmatrix} = \begin{pmatrix} n \\ 0 \\ \vdots \\ 0 \end{pmatrix}.$$

Then the currents $i_{\Sigma 1}$ for i from 1 to n−1 are defined such that:

$$P \times \begin{pmatrix} i_{\sigma 1} \\ i_{\sigma 2} \\ \vdots \\ i_{\sigma n} \end{pmatrix} = \begin{pmatrix} i_{\sigma M} \\ i_{\Sigma 1} \\ \vdots \\ i_{\Sigma n-1} \end{pmatrix}$$

P having the form:

$$P = \begin{pmatrix} 1 & 1 & \ldots & 1 \\ -Q \cdot \begin{pmatrix} 1 \\ \vdots \\ 1 \end{pmatrix} & & Q & \end{pmatrix}$$

where Q must be an invertible matrix.

If the vectors $u_n$ of dimension n (rows)×1 (column) and $u_{n-1}$ of dimension N−1 (rows)×1 (column) are defined $$u_n = \begin{pmatrix} 1 \\ 1 \\ \vdots \\ 1 \end{pmatrix} \text{ and } u_{n-1} = \begin{pmatrix} 1 \\ \vdots \\ 1 \end{pmatrix}$$

P is written as follows::

$$P = \left( \begin{array}{c|c} u_n^T & \\ \hline -Q \cdot u_{n-1} & Q \end{array} \right)$$

The inverse of P has the following form:

$$P^{-1} = \frac{1}{n} \left( \begin{array}{c|c} u_n & -u_{n-1}^T \cdot R \\ \hline & R \end{array} \right)$$

R is the matrix defined by:

$$R = n \times (I_{n-1} + u_{n-1} \cdot u_{n-1}^T)^{-1} \cdot Q^{-1}$$

This transformation is applied to the voltages. Then the voltages $v_{\Sigma 1}$ for i from 1 to n−1 are defined such that:

$$\begin{pmatrix} \sum_{i=1:n} V_{\sigma i} \\ V_{\Sigma 1} \\ \vdots \\ V_{\Sigma n-1} \end{pmatrix} = P \times \begin{pmatrix} V_{\sigma 1} \\ V_{\sigma 2} \\ \vdots \\ V_{\sigma n} \end{pmatrix} = \begin{pmatrix} \sum_{i=1:n} V_{\sigma i} \\ Q \times \begin{pmatrix} V_{\sigma 2} - V_{\sigma 1} \\ \vdots \\ V_{\sigma n} - N_{\sigma 1} \end{pmatrix} \end{pmatrix} = \begin{pmatrix} n \cdot V_{\sigma M}^{REF} + \sum_{i=1:n} V_{E\sigma i} \\ Q \times \begin{pmatrix} V_{E\sigma 2} - V_{E\sigma 1} \\ \vdots \\ V_{E\sigma n} - V_{E\sigma 1} \end{pmatrix} \end{pmatrix}$$

In these new coordinates, the relationship (2) becomes:

$$L \times \frac{d}{dt} \begin{pmatrix} i_{\sigma M} \\ i_{\Sigma 1} \\ \vdots \\ i_{\Sigma n-1} \end{pmatrix} = \begin{pmatrix} \sum_{i=1:n} V_{\sigma i} \\ V_{\Sigma 1} \\ \vdots \\ V_{\Sigma n-1} \end{pmatrix} - \begin{pmatrix} n \\ 0 \\ \vdots \\ 0 \end{pmatrix} \cdot V_{\sigma M} \quad (3)$$

The currents $i_{\Sigma 1}$ are of the form:

$$\begin{pmatrix} i_{\Sigma 1} \\ \vdots \\ i_{\Sigma n-1} \end{pmatrix} = (-Q \cdot u_{n-1} Q) \times \begin{pmatrix} i_{\sigma 1} \\ i_{\sigma 2} \\ \vdots \\ i_{\sigma n} \end{pmatrix} = Q \times \begin{pmatrix} i_{\sigma 2} - i_{\sigma 1} \\ \vdots \\ i_{\sigma n} - i_{\sigma 1} \end{pmatrix}$$

Row 1 of system (3) relates to the motor control. It can be considered that each variable speed drive provides a component for $$\sum_{i=1:n} V_{\sigma i} = n \cdot V_{\sigma M}^{REF} + \sum_{i=1:n} V_{E\sigma i}$$

Now only rows from 2 to n are considered, dealing with the issue of controlling the flowing current, giving:

$$L \times \frac{d}{dt} \begin{pmatrix} i_{\Sigma 1} \\ \vdots \\ i_{\Sigma n-1} \end{pmatrix} = \begin{pmatrix} V_{\Sigma 1} \\ \vdots \\ V_{\Sigma n-1} \end{pmatrix} \quad (4)$$

At this stage, the control voltages should be defined by the following relationships:

$$\begin{pmatrix} V_{\Sigma 1} \\ \vdots \\ V_{\Sigma n-1} \end{pmatrix} = f \begin{pmatrix} i_{\Sigma 1} \\ \vdots \\ i_{\Sigma n-1} \end{pmatrix}$$

The function f has the property of stabilizing system (4). Two examples are cited and, without loss of general application, this is followed by the example of the proportional action corrector.

As a first example, the case of a proportional action corrector may be defined:

$$\begin{pmatrix} V_{\Sigma 1} \\ \vdots \\ V_{\Sigma n-1} \end{pmatrix} = K \times \begin{pmatrix} i_{\Sigma 1} \\ \vdots \\ i_{\Sigma n-1} \end{pmatrix}$$

The matrix K has the property of having all these eigenvalues with strictly negative real parts. This property ensures an exponential convergence towards zero of the current deviations in the case of system (3).

As a second example, the case of a proportional and integral action corrector may be defined.

$$\begin{pmatrix} V_{\Sigma 1} \\ \vdots \\ V_{\Sigma n-1} \end{pmatrix} = K_P \times \begin{pmatrix} i_{\Sigma 1} \\ \vdots \\ i_{\Sigma n-1} \end{pmatrix} + \int K_I \times \begin{pmatrix} i_{\Sigma 1} \\ \vdots \\ i_{\Sigma n-1} \end{pmatrix} \times dt$$

W is defined as the state of the integrators:

$$\begin{pmatrix} W_1 \\ \vdots \\ W_{n-1} \end{pmatrix} = \int K_I \times \begin{pmatrix} i_{\Sigma 1} \\ \vdots \\ i_{\Sigma n-1} \end{pmatrix} \times dt$$

With system (4), the following is obtained:

$$L \times \frac{d}{dt} \begin{pmatrix} i_{\Sigma 1} \\ \vdots \\ i_{\Sigma n-1} \end{pmatrix} = K_P \times \begin{pmatrix} i_{\Sigma 1} \\ \vdots \\ i_{\Sigma n-1} \end{pmatrix} + \begin{pmatrix} W_1 \\ \vdots \\ W_{n-1} \end{pmatrix}$$

$$\frac{d}{dt} \begin{pmatrix} W_1 \\ \vdots \\ W_{n-1} \end{pmatrix} = K_I \times \begin{pmatrix} i_{\Sigma 1} \\ \vdots \\ i_{\Sigma n-1} \end{pmatrix}$$

The matrices Kp and Ki have the property of stabilizing the system thus composed, i.e. the matrix $K_{PI}$ has the property of having all its eigenvalues with strictly negative real parts, where $$K_{PI} = \begin{pmatrix} \frac{K_P}{L} & \frac{I_N - 1}{L} \\ \frac{K_I}{L} & 0_{N-1} \end{pmatrix}$$

Where $I_{N-1}$ is the identity matrix of dimension N−1, and $0_{N-1}$ is the zero matrix of dimension N−1.

Returning to the voltages to be delivered by each variable speed drive in the case of a proportional action correction, the following relationship is obtained:

$$\begin{pmatrix} V_{E\sigma 2} - V_{E\sigma 1} \\ \vdots \\ V_{E\sigma n} - V_{E\sigma 1} \end{pmatrix} = Q^{-1} \times K \times Q \times \begin{pmatrix} i_{\sigma 2} - i_{\sigma 1} \\ \vdots \\ i_{\sigma n} - i_{\sigma 1} \end{pmatrix}$$

According to the matrix $G = Q^{-1} \times K \times Q$, the currents must be shared between the various variable speed drives.

Case 1: selection of $Q = I_{N-1}$ (identity matrix), and K a diagonal matrix.

Selecting $v_{E\sigma 1} = 0$, gives G=K, and:

$$\begin{cases} V_{E\sigma 2} = K_2 \times (i_{\sigma 2} - i_{\sigma 1}) \\ \vdots \\ V_{E\sigma n} = K_n \times (i_{\sigma n} - i_{\sigma 1}) \end{cases}$$

This requires that the current of variable speed drive 1 is shared with the other variable speed drives.

Case 2: selection of $$Q = \begin{pmatrix} 1 & 0 & \cdots & 0 \\ -1 & 1 & \ddots & \vdots \\ 0 & \ddots & \ddots & 0 \\ 0 & 0 & -1 & 1 \end{pmatrix},$$

and K a matrix $$K = \begin{pmatrix} k_2 & 0 & \cdots & 0 \\ -k_2 & k_3 & \ddots & \vdots \\ 0 & \ddots & \ddots & 0 \\ 0 & 0 & -k_{n-1} & k_n \end{pmatrix}$$

Selecting $V_{E\sigma 1}=0$, gives $$G = \begin{pmatrix} k_2 & 0 & \cdots & 0 \\ -k_3 & k_3 & \ddots & \vdots \\ 0 & \ddots & \ddots & 0 \\ 0 & 0 & -k_n & k_n \end{pmatrix} \text{ and } \begin{cases} V_{E\sigma 2} = K_2 \times (i_{\sigma 2} - i_{\sigma 1}) \\ V_{E\sigma n} = K_n \times (i_{\sigma n} - i_{\sigma n-1}) \end{cases}$$

This then requires that the current of the variable speed drive i−1 is shared with the variable speed drive i (for i ranging from 2 to n).

The invention claimed is:

1. A system for controlling an electrical load, the system comprising:
   a first power converter and a second power converter connected in parallel, each of the first power converter and the second power converter including an inverter stage with an output connected to the electrical load;
   a first controller configured to control the inverter stage of the first power converter, the first controller including a first main control module configured to determine a first output voltage to be applied to the electrical load, the first output voltage being determined based on a first output current of the first power converter; and
   a second controller configured to control the inverter stage of the second power converter, the second controller including:
      a second main control module configured to determine a second output voltage to be applied to the electrical load, the second output voltage being based on a second output current of the second power converter, and
      a secondary control module configured to determine a correction voltage to be applied to the second output voltage, the correction voltage being determined based on a difference between the second output current of the second power converter and the first output current of the first power converter,
   wherein the first power converter and the second power converter are asymmetrical in terms of configuration and components in that the first power converter does not include a respective secondary control module configured to determine a correction voltage, to be applied to the first output voltage, the correction voltage being determined based on a difference between the second output current of the second power converter and the first output current of the first power converter.

2. The control system as claimed in claim 1,
   wherein the first power converter and the second power converter each include a DC power supply bus configured to apply a DC voltage to the inverter stage of the first power converter and the inverter stage of second power converter, and
   wherein the first power converter and the second power converter are interconnected by the DC power supply buses.

3. The control system as claimed in claim 2, wherein the DC power supply bus of the first power converter and the DC power supply bus of the second power converter each include a power supply line with a positive electrical potential and a power supply line with a negative electrical potential.

4. The control system as claimed in claim 2, wherein the output of the first power converter is connected to the output of the second power converter.

5. The control system as claimed in claim 1, further comprising:
   a first inductor having a first end coupled to an output of the inverter stage of the first power converter and a second end coupled to the electrical load; and
   a second inductor having a third end coupled to an output of the inverter stage of the second power converter and a fourth end coupled to the electrical load.

6. The control system as claimed in claim 1,
   wherein the first main control module includes a first multiplier configured to multiply the first output current by n number of power converters, including the first power converter and the second power converter, of the control system, where n is a non-zero integer of 2 or greater, and
   wherein the second main control module includes a second multiplier configured to multiple the second output current by the n number of power converters of the control system.

* * * * *